(12) United States Patent
Akashi et al.

(10) Patent No.: US 8,635,927 B2
(45) Date of Patent: Jan. 28, 2014

(54) SPEED CHANGE DEVICE OF A TRANSMISSION

(75) Inventors: Kouhei Akashi, Kanagawa (JP); Tadashi Ikeda, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 249 days.

(21) Appl. No.: 12/735,442

(22) PCT Filed: Feb. 6, 2009

(86) PCT No.: PCT/JP2009/052032
§ 371 (c)(1),
(2), (4) Date: Jul. 16, 2010

(87) PCT Pub. No.: WO2009/104483
PCT Pub. Date: Aug. 27, 2009

(65) Prior Publication Data
US 2010/0294070 A1 Nov. 25, 2010

(30) Foreign Application Priority Data

Feb. 19, 2008 (JP) .................................. 2008-037723

(51) Int. Cl.
*B60K 20/00* (2006.01)
*F16H 59/04* (2006.01)

(52) U.S. Cl.
USPC ...................................................... 74/473.36

(58) Field of Classification Search
USPC ........... 74/335, 473.1, 473.21, 473.24, 473.3, 74/473.33, 473.35, 473.36, 473.37
See application file for complete search history.

(56) References Cited

U.S. PATENT DOCUMENTS

| | | | | |
|---|---|---|---|---|
| 4,662,233 A | * | 5/1987 | Mazzorana | ...................... 74/7 A |
| 5,689,997 A | * | 11/1997 | Schaller | ........................... 74/335 |

(Continued)

FOREIGN PATENT DOCUMENTS

| | | |
|---|---|---|
| DE | 195 43 645 A1 | 5/1997 |
| DE | 19543645 | * 5/1997 |

(Continued)

OTHER PUBLICATIONS

European Search Report dated Mar. 21, 2011.

*Primary Examiner* — Troy Chambers
*Assistant Examiner* — Alexander Vu
(74) *Attorney, Agent, or Firm* — McGinn Intellectual Property Law Group, PLLC

(57) ABSTRACT

A speed change device for shifting the gear of a transmission by using a cylindrical drum that reciprocally moves and rotates, featuring the structure of a compact size and excellent operability. To execute the shifting operation, the speed change device of the invention uses a cylindrical drum 4 that reciprocally moves in the axial direction and is rotatably supported. Fork pins FP1 to FP4 coupled to a plurality of forks of the transmission are fitted into drum grooves 41 to 44 formed in the cylindrical surface of the cylindrical drum. In each drum groove, there are formed small width portions of a width nearly equal to that of the fork pin and large width portions wider than the small width portions in a manner that the fork pin positioned at the small width portion is shifted. To shift the gear, the cylindrical drum 4 is rotated by a select motor 6 to select the fork pin positioned at the small width portion. Next, a threaded shaft 1 is rotated by a shift motor 7 to move the cylindrical drum 4 in the axial direction to thereby shift the selected fork pin.

10 Claims, 7 Drawing Sheets

(56) References Cited

U.S. PATENT DOCUMENTS

| | | | |
|---|---|---|---|
| 5,724,856 A * | 3/1998 | Back | 74/335 |
| 5,966,989 A * | 10/1999 | Reed et al. | 74/331 |
| 6,003,395 A * | 12/1999 | Rogg et al. | 74/335 |
| 6,109,125 A * | 8/2000 | Schubert et al. | 74/89.22 |
| 6,220,109 B1 * | 4/2001 | Fischer et al. | 74/337.5 |
| 6,286,381 B1 * | 9/2001 | Reed et al. | 74/336 R |
| 6,780,134 B2 * | 8/2004 | Vonnegut et al. | 475/204 |
| 6,932,204 B2 * | 8/2005 | Dolan | 192/21.5 |
| 7,387,042 B2 * | 6/2008 | Suzuki et al. | 74/335 |
| 7,487,691 B2 * | 2/2009 | Kapp et al. | 74/337.5 |
| 7,631,570 B2 * | 12/2009 | Mizuno et al. | 74/331 |
| 7,661,331 B2 | 2/2010 | Ogami et al. | |
| 7,752,936 B2 * | 7/2010 | Kobayashi et al. | 74/337.5 |
| 2007/0240530 A1 | 10/2007 | Ogami et al. | |
| 2010/0294070 A1 * | 11/2010 | Akashi et al. | 74/473.36 |

FOREIGN PATENT DOCUMENTS

| | | |
|---|---|---|
| DE | 101 28 854 A1 | 12/2002 |
| EP | 1 122 468 A1 | 8/2001 |
| JP | 2527834 Y2 | 12/1996 |
| JP | 9-112688 A | 5/1997 |
| JP | 2002-349697 A | 12/2002 |
| JP | 2003-148615 A | 5/2003 |
| JP | 2005-331084 A | 12/2005 |
| JP | 2007-24079 A | 2/2007 |
| JP | 2007-285363 A | 11/2007 |

* cited by examiner

SPEED CHANGE DEVICE OF A TRANSMISSION

TECHNICAL FIELD

This invention relates to a speed change device for shifting the gear of a transmission of a vehicle. More specifically, the invention relates to a speed change device suited for a vehicle on which an automatic transmission is mounted.

As the power transmission devices of vehicles, there have been proposed various kinds of speed-changing devices for automatically carrying out the operation of the transmission requiring no clutch operation for easy driving and for reducing fatigue to the drivers. A representative example may be an automatic transmission (AT) incorporating a torque converter and planetary gears. Among the automatic speed-changing devices, however, there exists a power transmission device that uses a transmission of the type of parallel shaft gear mechanism similar to the manual transmission (MT). In this power transmission device, the gear is shifted responsive to a driver's instruction or an instruction from an electronic control device such as a computer, and the transmission is equipped with an actuator for shifting the gear responsive to the instruction.

The transmission of the type of parallel shaft gear mechanism has a dog clutch of the type which moves, by using a bifurcated fork, a speed-changing sleeve that engages with the dog teeth integral with the gear to shift the gear. In the operation for changing the speed, one of a plurality of shift rods (often called fork shafts) arranged in parallel is moved to bring the speed-changing sleeve for power transmission into mesh with the dog teeth via a fork coupled to the shift rod or to release them. The transmission incorporates the speed change device for executing the above operation while the speed change device is equipped with a shift rod operation member such as shift-and-select lever for moving the shift rod. The shift rod operation member selects a shift rod that is to be moved (select), and is allowed to move in a direction at right angles with the shift rod and in the axial direction thereof to move the fork in the axial direction to bring (shift) the speed-changing sleeve into mesh. Some transmissions incorporate a speed change device which has no shift rod but works to shift the fork fitted directly into the speed-changing sleeve. Hereinafter, the members such as the shift rod for moving the fork, inclusive of those provided for the fork itself are often referred to as fork operation members.

The transmission of the type of parallel shaft gear mechanism for automatically changing the gear is provided with a select actuator for operating the shift rod operation member in the direction of selection and a shift actuator for operating the sift rod operation member in the direction of shift. As the actuator, there has recently been developed an electric actuator using an electric motor as a drive source to substitute for a fluid pressure actuator that that is heavy and requires a fluid pressure source. A speed change device using the electric actuator has been disclosed in, for example, JP-A-2002-349697.

There has further been proposed a speed change device equipped with a cylindrical cam drum and in which a pin of a fork operation member is fitted into a cam groove having a tilted portion formed in the surface thereof, and the cam drum is rotated to move the fork of the speed-changing sleeve in the direction of shift. The above speed change device has been disclosed, for example, in Japanese Utility Model Registration No. 2527834. If compared to the ordinary speed change device which selects and shifts one of a plurality of shift rods integral with the forks by using a shift rod operation member, the above speed change device is capable of executing the operation for changing the speed by using a single cam drum offering an advantage of compact structure. FIG. 7 shows the speed change device using the cylindrical cam drum disclosed in Japanese Utility Model Registration No. 2527834.

The transmission of FIG. 7 is a compound transmission constituted by a main transmission unit MG and a sub-transmission unit SG. Two input gears 20A and 20B are fixed to a counter shaft 20 driven by an input shaft 10. In the sub-transmission unit SG, the rotational speed of the counter shaft 20 can be changed into two speeds, i.e., a high speed and a low speed. The main transmission unit MG includes a plurality of loose-fit gears 30G that are loosely fitted onto an output shaft 30 and are in mesh with the gears of the counter shaft 20 at all times, and dog teeth GT are fixed to the loose-fit gears 30G integrally therewith. A hub HB fixed to the output shaft 30 but without allowed to rotate is arranged between the two loose-fit gears 30G, and a speed-changing sleeve SV is spline-fitted to the outer circumference thereof. The speed-changing sleeve SV is caused to move toward the right and left by a fork FK fitted to a central recessed groove. When the speed-changing sleeve SV is brought into mesh with the dog teeth GT of either one of the neighboring loose-fit gears 30G, the power is transmitted via the loose-fit gear 30G that is in mesh. When the speed-changing sleeve SV is at its neutral position, however, the meshing is released, and the transmission of power is interrupted. The gear changing device of the above dog clutch type has been generally employed for the transmissions of the type of parallel shaft gear mechanism.

The fork FK is a member of the shape of a bifurcated arm formed on the fork sleeve FS which is fitted onto its support shaft GR so as to slide therealong. The fork sleeve FS has a lever FL formed on the opposite side of the fork FK, and the end of the lever FL is fitted into a cam groove CA having a tilted portion formed in the surface of the cylindrical cam drum CD. The fork sleeve FS and the lever FS constitute the fork operation member of the transmission.

To shift the gear in the main transmission unit MG, the cam drum CD is rotated by using an operation lever CL. Therefore, the fork sleeve FS slides in the axial direction being pushed by the lever FL fitted into the cam groove CA causing the fork FK to be shifted in the axial direction, whereby the speed-changing sleeve SV for power transmission and the dog teeth GT come in mesh or are released. Between the dog teeth GT of the loose-fit gear 30G which is a forward gear and the speed-changing sleeve SV, there is arranged a known synchronizer ring that works as a synchronizing mechanism at the time of meshing. Two cam grooves CA and CB are formed in the cam drum CD of the transmission for operating two forks FK (A) (B). Only one fork moves (FK (A) moves at a position shown) depending upon the rotational position of the cam drum CD to conduct the operation that corresponds to the selection.

Patent document 1: JP-A-2002-349697
Patent document 2: Japanese Utility Model Registration No. 2527834

DISCLOSURE OF THE INVENTION

Problems that the Invention is to Solve

In the speed change device using the cylindrical cam drum shown in FIG. 7, the cam drum is rotated to select the fork that is to be moved and to shift the fork in the axial direction. This speed change device features a compact structure as compared to the ordinary speed change device. Further, the plurality of cam grooves are tilted (CA in FIG. 7) at portions to where the fork to be moved is fitted depending upon the rotational position of the cam drum but are not tilted (CB in FIG. 7) at portions where the fork that is not to be moved is fitted, to thereby constitute a so-called interlock mechanism which fixes the fork that is not to be moved to prevent double meshing.

However, the cylindrical cam drum must have cam grooves formed in the axial direction in a number corresponding to the number of forks of the transmission and must, further, have tilted portions in the cam grooves at separate rotational positions corresponding to the number of forks in the circumferential surface of the cam drum (see FIG. 6(b) described later). The tilted portion of the cam groove for shifting the fork in the axial direction requires a predetermined circumferential length. If the number of the gears of the transmission increases and, therefore, the number of the forks increases, then the outer diameter of the cam drum also increases. If the outer diameter increases, it becomes necessary to increase the torque for rotating the cam drum to obtain an axial thrust for shifting the fork, resulting in an increase in the size of a drive unit such as a motor for driving the cam drum and requiring an increased output of the motor. Besides, an increase in the size of the cam drum brings about deteriorated operability of transmission, such as a decrease in the shifting speed caused by an increased inertial weight and deteriorated response.

In the cylindrical cam drum, further, the fork operation member such as lever fits to the cam groove formed in the circumferential surface, and the fork moves in the direction of shift due to the tilted portion in the cam groove. Here, the fork operation member slides along the tilted surface of the cam groove in contact therewith and, therefore, a large slide resistance occurs between the two. This lowers the efficiency for transmitting the shift operation force for shifting the fork. Therefore, the torque for rotating the cam drum must be increased to obtain the shift operation force and the operation speed necessary for the quick shift operation. From this point of view, too, it becomes necessary to increase the output of the drive unit that drives the cam drum. At the same time, the sliding between the fork operation member and the tilted portion of the cam groove develops wear on the contact surfaces between the two.

The problem of the present invention is to provide a speed change device suited for a transmission mounted on a vehicle and, particularly, for a transmission which automatically changes the speed, i.e., to provide a speed change device of a compact structure using a cylindrical drum and is free from the above-mentioned problems.

Means for Solving the Problem

In view of the above problems according to the present invention, a plurality of drum grooves are provided in the cylindrical surface of a cylindrical drum so that fork operation members are fitted thereto, each drum groove forming a small width portion having a width in the axial direction nearly equal to that of the fork operation member and a large width portion wider than the small width portion such that the fork operation member positioned at the small width portion is shifted depending upon the rotation of the cylindrical drum. By moving the cylindrical drum in the axial direction, the fork operation member positioned at the small width portion moves in the direction of shift. Namely, the present invention is concerned with "a speed change device for shifting the gear of a transmission, the transmission comprising a plurality of speed-changing sleeves that move in the axial direction to shift the gear, and a plurality of forks for moving the speed-changing sleeves; wherein, the plurality of forks have fork operation members coupled thereto, and a cylindrical drum is installed so as to be reciprocally movable in the axial direction and being rotatably supported, the cylindrical surface of the cylindrical drum forming a plurality of drum grooves into which the fork operation members are fitted; and the drum grooves are each forming, continuously in the circumferential direction, small width portions with their both sides being perpendicular to the axial direction of the cylindrical drum and having a width in the axial direction nearly equal to that of the fork operation member and large width portions having a groove width in the axial direction wider than that of the fork operation member, the small width portions and the large width portions in the plurality of the drum grooves being so provided that the fork operation member positioned at the small width portion is shifted depending upon the rotation of the cylindrical drum, whereby the fork operation member positioned at the small width portion of the drum groove is selected by the rotation of the cylindrical drum, and the selected fork operation member is moved in the axial direction of the cylindrical drum by the reciprocal motion of the cylindrical drum."

As described in claim 2, it is desired that the cylindrical drum is fitted onto a rotary drum sleeve so as to slide but so as not to rotate, and is screw-coupled to a threaded shaft that is arranged penetrating through the drum sleeve in concentric with the drum sleeve; and the cylindrical drum rotates accompanying the rotation of the drum sleeve, and reciprocally moves in the axial direction accompanying the rotation of the threaded shaft.

As described in claim 3, further, it is desired that the plurality of fork operation members are linearly arranged in the axial direction of the cylindrical drum. In this case as described in claim 4, one of the plurality of fork operation members has a shift rod that extends in the axial direction of the cylindrical drum and is supported so as to slide, a fork is fixed to an end portion of the shift rod, and the other forks are fitted onto the shift rod so as to slide and move on the shift rod accompanying the reciprocal motion of the cylindrical drum.

As described in claim 5, the speed change device of the invention is desirably used for a dual clutch type transmission having two clutches and two input shafts connected to the respective clutches.

Effects of the Invention

The speed change device of the invention has a cylindrical drum that is reciprocally movable in the axial direction and is rotatably supported, the cylindrical surface of the cylindrical drum forming a plurality of drum grooves to which the fork operation members coupled to a plurality of forks are fitted. The drum grooves are each forming small width portions and large width portions continuously in the circumferential direction. In the plurality of drum grooves, the small width portions and the large width portions are so formed that the fork operation member positioned at the small width portion is shifted depending upon the rotation of the cylindrical drum. The small width portion in the drum groove has both sides thereof perpendicular to the axial direction of the cylindrical drum and has the width in the axial direction nearly equal to that of the fork operation member while the large width portion has the width in the axial direction which is wider than that of the fork operation member. Therefore, when the cylindrical drum moves in the axial direction, only the fork operation member positioned at the small width portion, among the plurality of fork operation members, moves in the axial direction together with the cylindrical drum while the other fork operation members positioned at the large width portions do not move but stay at those positions.

In shifting the gear of the transmission, the cylindrical drum is rotated by a drive unit such as a motor so that the fork operation member coupled to the fork to be shifted is positioned at the small width portion in the drum groove. Next, the cylindrical drum is displaced in the axial direction by the other drive unit such as a motor, whereby the fork operation member positioned at the small width portion moves in the axial direction, and the fork coupled to the fork operation member is shifted.

According to the speed change device of the present invention as described above, the select operation for selecting the fork that is to be shifted is executed by the rotation of the cylindrical drum, and the shift operation for shifting the fork is executed by the motion of the cylindrical drum in the axial direction; i.e., the select operation and the shift operation are executed independently by the cylindrical drum as it rotates and reciprocally moves. Namely, according to the present invention, unlike the cam drum in the conventional speed change device, the cylindrical drum does not select the fork while at the same time shifting it fork in the axial direction by the rotation thereof. Therefore, the drum grooves formed in the cylindrical surface of the cylindrical drum do not have to be provided with tilted portions for moving the fork in the axial direction. It is, therefore, allowed to greatly decrease the outer diameter of the cylindrical drum as compared to that of the conventional cam drum, to decrease the rotational torque required for the rotation and, hence, to decrease the size of the drive unit such as a motor. At the same time, it is allowed to decrease the size of the whole speed change device, to decrease the inertial weight and to improve the operability of the transmission.

In the speed change device of the invention, further, the fork operation member positioned at the small width portion of the drum groove is moved in the axial direction by the cylindrical drum that reciprocally moves. Therefore, both sides of the small width portion of the drum groove are forming wall surfaces perpendicular to the axial direction of the cylindrical drum. Unlike the cam grooves in the conventional cam drum, the drum grooves in the cylindrical drum of the present invention contain no tilted portion along which the fork operation member slides in contact therewith. Therefore, the speed change device of the present invention alleviates the slide resistance at the time of shifting the fork operation member or a decrease in the transmission efficiency caused thereby. The fork operation member moves in the axial direction of the cylindrical drum being pushed onto the wall surface perpendicular to the axial direction, and no sliding motion takes place between the two. Therefore, no wear occurs in the contact surfaces.

In the invention of claim 2, the cylindrical drum is fitted onto the rotary drum sleeve so as to slide but so as not to rotate, and the threaded shaft is arranged penetrating through the drum sleeve in concentric therewith. The cylindrical drum is screw-coupled to the threaded shaft. The threaded shaft constitutes a so-called feed screw mechanism. Upon rotating the drum sleeve, the cylindrical drum rotates, too, to execute the select operation. Upon rotating the threaded shaft, the cylindrical drum reciprocally moves in the axial direction to execute the shift operation. The speed change device as a whole is compact in size since the drum sleeve and the cylindrical drum are arranged in concentric with the threaded shaft that rotates. Besides, since the cylindrical drum reciprocally moves relying on the rotation of the threaded shaft, no mechanism is required for converting the rotary motion into the reciprocal motion. Therefore, the drive unit such as motor can be easily laid out.

As in the invention of claim 3, when the plurality of fork operation members are linearly arranged in the axial direction of the cylindrical drum, the fork operation members are all aligned in the axial direction of the cylindrical drum enabling the speed change device to be more compactly fabricated and facilitating the assembling operation. When the fork operation members are linearly arranged as in the invention of claim 4, one of the plurality of fork operation members is provided with a shift rod that extends in the axial direction of the cylindrical drum and is supported so as to slide, a fork is coupled to the shift rod, and the other forks are fitted to the shift rod to constitute the speed change device. This makes it possible to simplify the device for supporting the forks and the fork operation members in a manner to move in the axial direction.

In the invention of claim 5, the speed change device of the invention is adapted to a dual clutch type transmission having two clutches and two input shafts connected to the respective clutches. The dual clutch type transmission (often called twin clutch type transmission) shifts the gear while controlling the connection of the two clutches in a state where both of the gears of the two input shafts are engaged. Therefore, the speed change device used therein must execute complex operations. When the speed change device of the invention is adapted, a variety of fork position controls can be realized by varying the arrangements of small width portions and large width portions in the drum grooves in the cylindrical drum making it possible to suitably cope with the complex operations for shifting the gears.

DESCRIPTION OF REFERENCE NUMERALS

Figure 1:
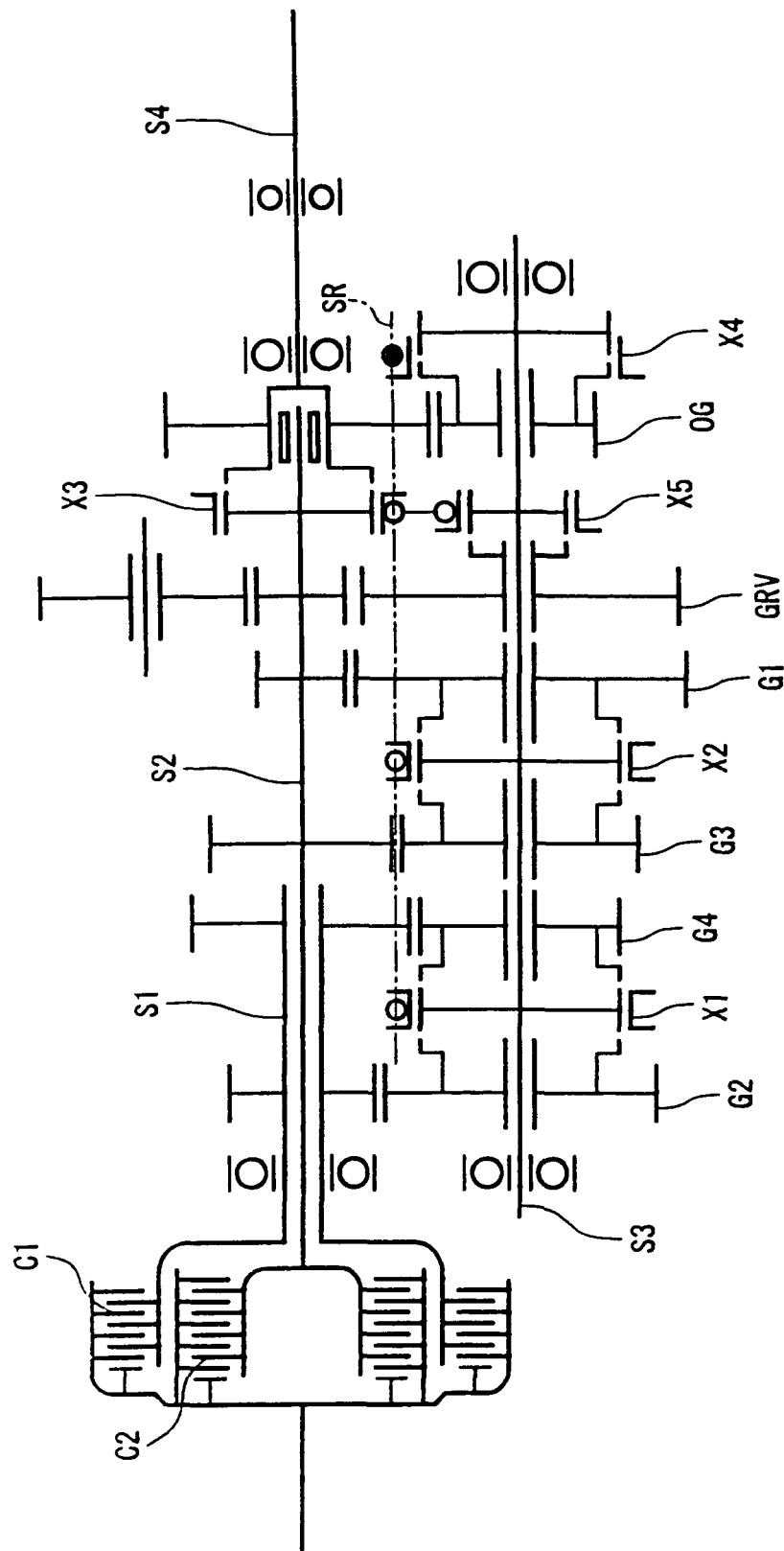
FIG. 1 is a diagram schematically illustrating a dual clutch type transmission to which a speed change device of the invention is adapted.

1 threaded shaft
2 casing
3 drum sleeve
4 cylindrical drum
41 to 44 drum grooves
5 nut body
6 select motor
7 shift motor
F1 to F4 forks
FP1 to FP4 fork pins (fork operation members)

BEST MODE FOR CARRYING OUT THE INVENTION

An embodiment of the speed change device of the invention will now be described with reference to the drawings. In this embodiment, the invention is adapted to the speed change device of the dual clutch type transmission. First, the structure and operation of the dual clutch type transmission will be briefly described with reference to FIG. 1.

In the dual clutch type transmission, there are arranged a first input shaft S1 and a second input shaft S2 of a double tubular structure, the second input shaft S2 extending rearward penetrating through the first hollow input shaft S1. At the front parts of the input shafts, there are provided a first clutch C1 and a second clutch C2 of the type of wet multiple disks arranged in concentric, the input sides of the respective clutches being connected to an engine output shaft. An intermediate shaft (counter shaft) S3 is installed in parallel with these input shafts, and an output shaft S4 of the transmission continuous to a propeller shaft of the vehicle is arranged on the rear side of the transmission. The output shaft S4 is coupled to the intermediate shaft S3 through an output shaft drive gear train OG and is also coupled to the second input shaft S2 through a direct connection clutch X3. The engine power is transmitted to the output shaft S4 through the intermediate shaft S3 and the output shaft drive gear train OG or through the direct connection clutch X3. The dual clutch type transmission of FIG. 1 is equipped with a disconnecting clutch X4 for disconnecting the transmission through the output shaft drive gear train OG.

To change the speed, many gear trains having different reduction ratios are arranged between the first input shaft S1, second input shaft S2 and the intermediate shaft S3. On the first input shaft S1, there are arranged fixed gears of even speeds, such as a second speed gear train G2 and a fourth speed gear train G4. On the second input shaft S2, on the other hand, there are arranged a first speed gear train G1 and a third speed gear train G3 which are the odd speed gears, as well as fixed gears of a reverse gear train GRV. The fixed gears are in mesh with loose-fit gears that are loosely fitted to the intermediate shaft S3, i.e., that are rotatably fitted thereto. Thus, gear trains of every other speed are arranged on each of the input shafts of the dual clutch type transmission.

Figure 7:
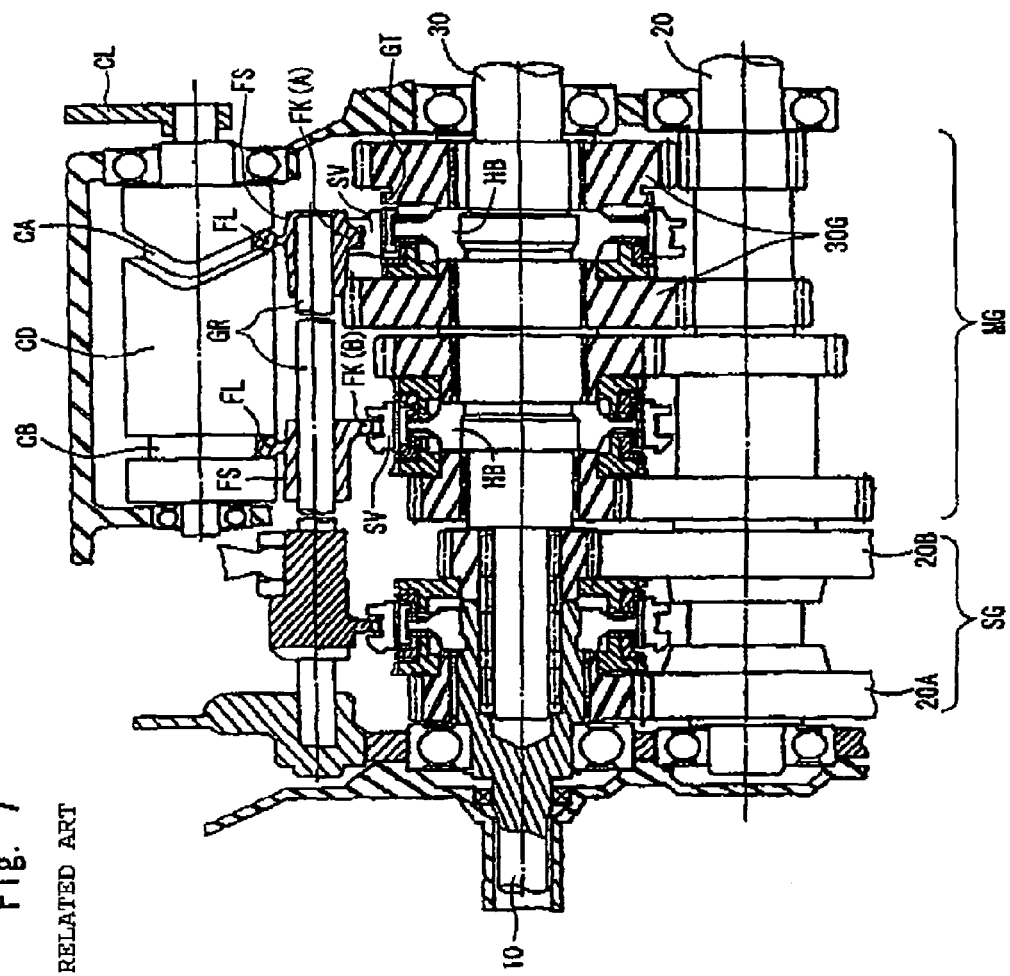
FIG. 7 is a view showing a conventional speed change device using a cam drum.

The gears loosely fitted to the intermediate shaft S3 have dog gears formed integrally therewith. On the intermediate shaft S3, further, there are installed a second speed-fourth speed changing device X1 and a first speed-third speed changing device X2. These changing devices are the same as the devices shown in FIG. 7 that are generally used for the transmission of the type of parallel shaft gear mechanism. Namely, the changing devices are the dog clutches of the type in which a speed-changing sleeve is moved by a bifurcated fork being equipped with a synchronizing mechanism. The direct connection clutch X3, disconnecting clutch X4 and reverse gear clutch X5, too, are constituted as similar dog clutches.

The first input shaft S1 and the second input shaft S2 of the dual clutch type transmission are rotatable independently from each other. At the time of changing the speed, for example, from the first gear to the second gear, therefore, the second speed-fourth speed changing device X1 can be brought in mesh with the second speed gear grain G2 prior to disconnecting the second clutch C2 and prior to releasing the mesh of the first speed-third speed changing device X2. After the second speed-fourth speed changing device X1 is brought in mesh with the second gear in advance, as described above, the second clutch C2 is connected while disconnecting the first clutch C1. Thus, the gear is shifted without substantially interrupting the transmission of engine power, and the shift is realized without the shock of shift. Further, since a large time margin is provided for synchronization, a decreased load such as frictional force acts on the synchronizing mechanism such as synchronizer ring, which is an advantage.

Figure 2:
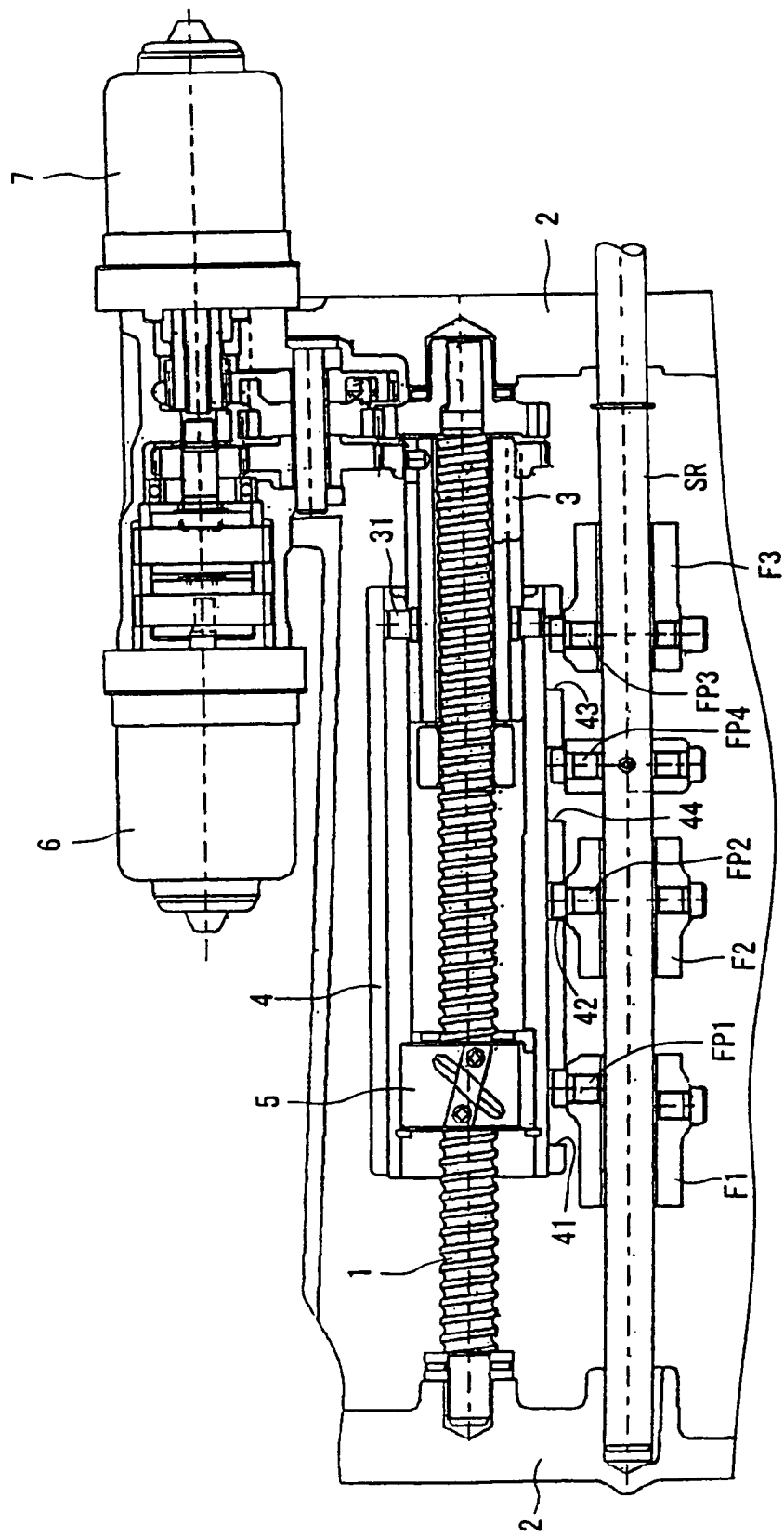
FIG. 2 is a view illustrating the whole constitution of the speed change device of the invention.
Figure 3:
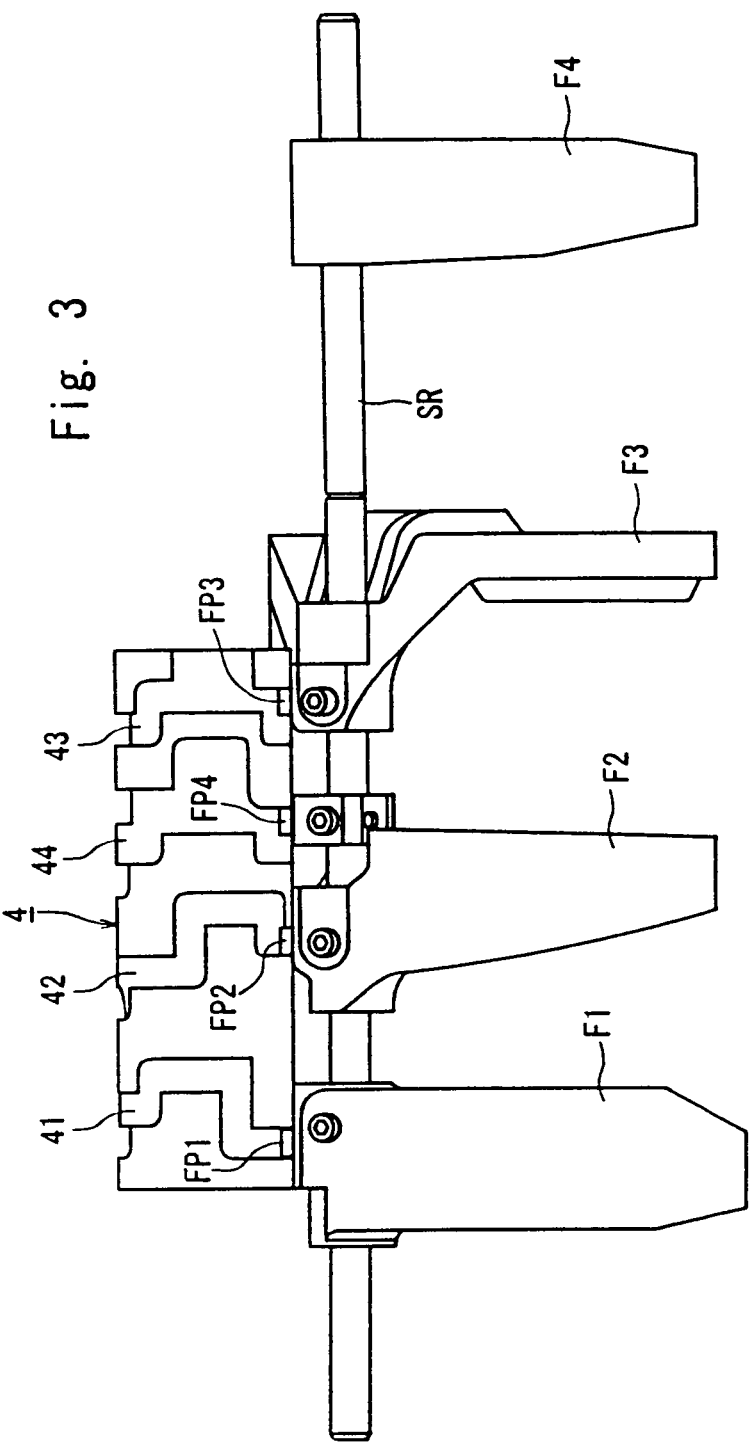
FIG. 3 is a view showing the appearance of a major portion in the speed change device of the invention.

FIGS. 2 and 3 are views illustrating the whole speed change device of the invention adapted to the dual clutch type transmission and showing the appearance of a major portion thereof.

Referring to FIG. 2, the speed change device has a threaded shaft 1 extending in the axial direction of the transmission, the threaded shaft 1 being supported at its both ends by a casing 2 of the transmission so as to rotate. The drum sleeve 3 is fitted onto the threaded shaft 1. The drum sleeve 3 is in concentric with the threaded shaft 1, rotates about the threaded shaft 1, and has an engaging pin 31 protruding outward. To the drum sleeve 3 is fitted an end of the cylindrical drum 4 that extends in the axial direction. The cylindrical drum 4 has a linear groove formed in the inner surface thereof in the axial direction and in which the engaging pin 31 of the drum sleeve 3 is inserted. The cylindrical drum 4 rotates together with the drum sleeve 3 and reciprocally moves in the axial direction of the drum sleeve 3.

The cylindrical drum 4 is fitted at its end portion into the drum sleeve 3 and has the nut body 5 fixed to an inner portion at the other end thereof, the nut body 5 being integral with the cylindrical drum 4. The nut body 5 together with the threaded shaft 1 constitutes a known ball-and-screw mechanism. Though not shown, the nut body 5 is internally threaded in the same direction as the thread of the threaded shaft 1, and many balls are inserted between the two screw grooves. Therefore, a rotation of the threaded shaft 1 causes the cylindrical drum 4 to move in the axial direction through the ball-and-screw mechanism, and the direction of motion changes depending upon the direction in which the threaded shaft 1 rotates.

The casing 2 of the transmission is provided with a select motor 6 and a shift motor 7 which are electric motors that can be rotated forward and reverse as a drive unit (actuator) to change the speed by driving the cylindrical drum 4. The select motor 6 is coupled to the drum sleeve 3 through a reduction gear and a gear train. Upon rotating the select motor 6, the cylindrical drum 4 rotates about the threaded shaft 1. On the other hand, the shift motor 7 is coupled to the threaded shaft 1 through a gear train and is rotated to reciprocally move the cylindrical drum 4.

In the casing 2 of the transmission, a plurality of fork pins FP1 to FP4 that serve as fork operation members are arranged being aligned straight so as to engage with the shift drum 4 (see FIG. 3). These fork pins work to operate the speed-changing sleeves of the dog clutches (changing devices) X1 to X5 in the dual clutch type transmission shown in FIG. 1; i.e., the fork pin FP1 is directly coupled to a fork F1 that operates the speed-changing sleeve of X1, the fork pin FP2 is directly coupled to a fork F2 that operates the speed-changing sleeve of X2, and the fork pin FP3 is directly coupled to a fork F3 that operates the speed-changing sleeves of X3 and X5. On the other hand, a fork F4 for operating the disconnecting clutch of X4 is attached to an end of a shift rod SR to which the fork pin FP4 is fixed. The fork F4 is operated by the shift rod SR that reciprocally moves in the axial direction. As will be obvious from FIG. 2, therefore, the shift rod SR is supported by the casing 2 so as to reciprocally move in the axial direction, and the forks F1 to F3 are fitted onto the shift rod SR so as to slide. The above constitution simplifies the support device that supports the plurality of forks so as to move in the axial direction. The shift rod SR in FIG. 1 is represented by a dot-dash chain line.

The fork pins FP1 to FP4 are, respectively, fitted into shift drum grooves 41 to 44 formed in the cylindrical surface of the shift drum 4. As will be described later, the fork pin selected by the rotation of the shift drum 4 moves in the axial direction due to the reciprocal motion of the shift drum 4.

Figure 4:
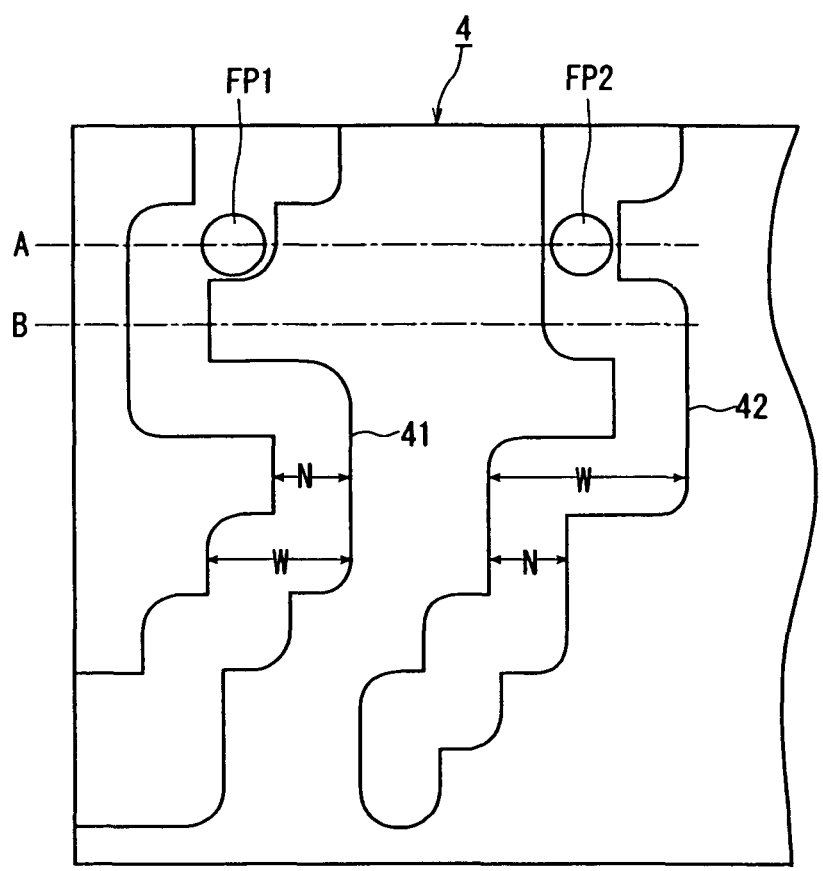
FIG. 4 is an expansion plan of the drum grooves according to the invention.
Figure 5:
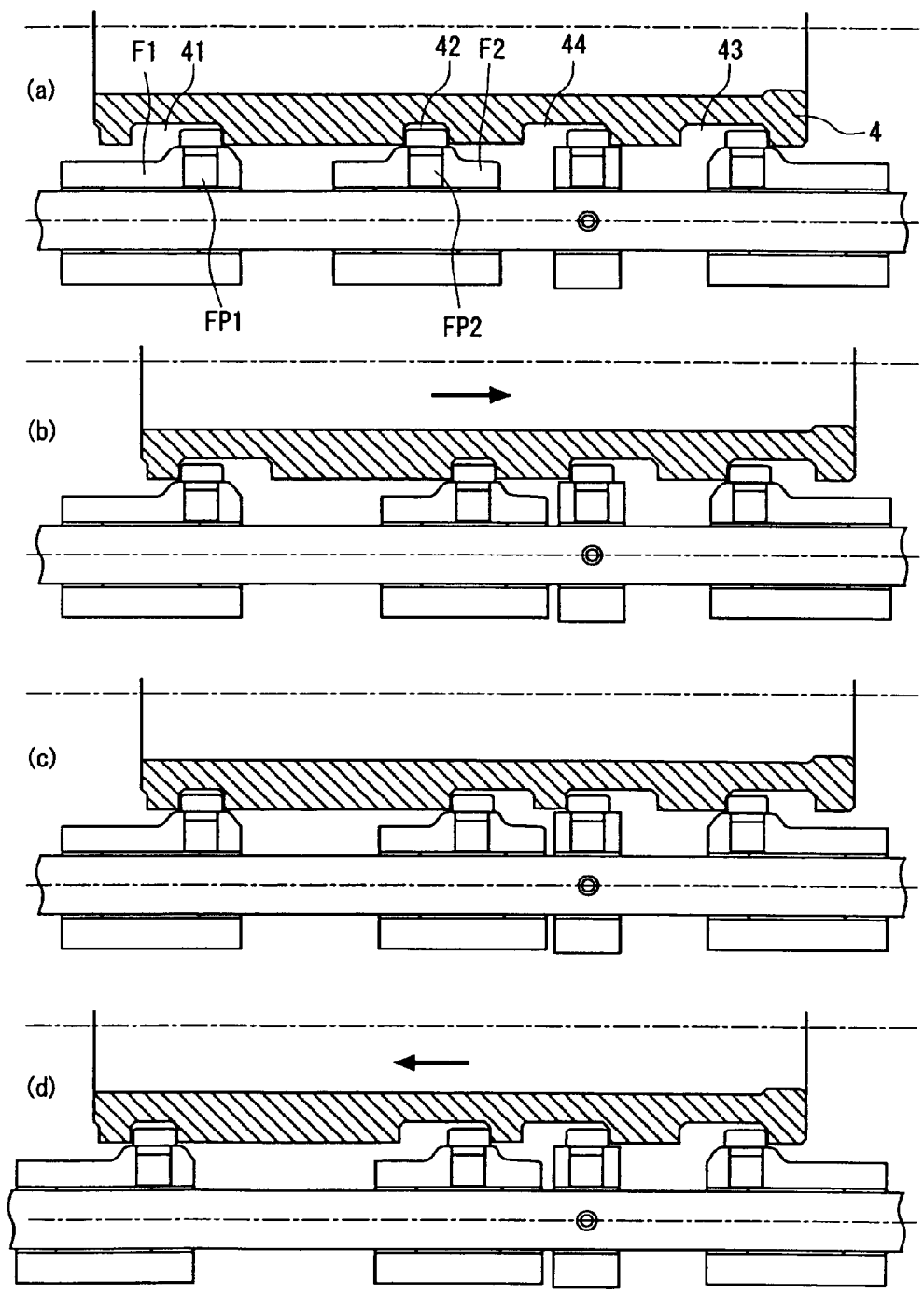
FIG. 5 is a view illustrating the operation of the speed change device of the invention.

Described below with reference to FIGS. 4 and 5 are the shapes of the drum grooves formed in the cylindrical surface of the cylindrical drum 4 and the operation of the speed change device of the invention. FIG. 4 is an expansion plan of the drum grooves formed in the cylindrical surface, and shows portions of the drum grooves 41 and 42 in which the fork pins FP1 and FP2 are inserted, and FIG. 5 shows a state where the forks and the like are moving due to the reciprocal motion of the cylindrical drum 4.

Referring to the expansion plan of FIG. 4, the drum grooves 41, 42 in the cylindrical surface have small width portions N having a width in the axial direction nearly equal to that of the fork pins FP1, FP2 and large width portions W having a width in the axial direction greater than that of the fork pins, that are continuously formed in the circumferential direction. Therefore, the fork pin positioned at the small width portion N (FP2 in the state of FIG. 4) is in a state of being locked on its both sides by the wall surfaces of the drum groove in the small width portion N, whereas the fork pin positioned at the large width portion W (FP1 in the state of FIG. 4) has space on its one side. The wall surfaces on both sides of the drum groove in the axial direction are perpendicular, at the small width portion N, to the axial direction of the cylindrical drum 4, and are basically perpendicular at the large width portion W, too. The corner portions, however, are rounded. These small width portions N and large width portions W are similarly formed in the drum grooves 43 and 44, too, though not shown in FIG. 4.

The fork pins FP1 and FP2 on a straight line A in FIG. 4 are at positions where the first speed-third speed changing device X2 and the second speed-fourth speed changing device X1 are released from being in mesh, i.e., are at the neutral positions. A relationship between the cylindrical drum 4 and the fork pins is as shown in a state (a) of a sectional view of FIG. 5. In this state, if the cylindrical drum 4 is moved toward the right in the axial direction in the drawing, then a state (b) is assumed where the fork pin FP2 positioned at the small width portion N moves toward the right together with the cylindrical drum 4 being pushed by the wall surface on the left side of the drum groove 42, and the speed-changing sleeve of the first speed-third speed changing device X2 is brought in mesh with the first gear. In this case, the three fork pins other than the fork pin FP2 are, respectively, positioned at the large width portions W of the drum grooves leaving spaces on their left sides. Despite the cylindrical drum 4 moves toward the right, therefore, these fork pins do not move in the axial direction but stay at their positions without bringing the second speed-fourth speed changing device X1 into mesh (here, however, the disconnecting clutch X4 is in mesh). Thus, by bringing the first speed-third speed changing device X2 into mesh with the first gear and connecting the clutch C2 of FIG. 1, the vehicle travels with the first speed.

To shift the transmission from the first speed to the second speed as described above, the dual clutch type transmission brings the second gear into mesh while maintaining the first gear in mesh. The speed change device drives the select motor 6 to rotate the drum sleeve 3 as well as the cylindrical drum 4 to thereby position the fork pins FP1 and FP2 on a straight line B in FIG. 4. Therefore, the relationship between the drum grooves and the fork pins shifts from the state (b) into a state (c), and the fork pin FP1 is positioned at the small width portion N. Next, the shift motor 7 is driven to rotate the threaded shaft 1. The cylindrical drum 4 integral with the nut body 5 moves toward the left in the axial direction causing the fork pin FP1 at the small width portion N to be shifted toward the left to assume a state (d). As a result of shifting the fork pin FP1, the speed-changing sleeve of the second speed-fourth speed changing device X1 is brought in mesh with the second gear. However, the fork pin FP2 positioned at the large width portion W does not move, and the first speed-third speed changing device X2 is maintained in a state where it is in mesh with the first gear. In this state, if the clutch C1 is connected while disconnecting the clutch C2, the transmission can be shifted from the first gear to the second gear without substantially interrupting the transmission of power from the engine.

The shifting operation such as shifting up from the second gear to the third gear and higher gears, too, is executed like the above operation by driving the select motor 6 to rotate the cylindrical drum 4 to thereby select a fork pin at the small width portion N, and driving the shift motor 7 to reciprocally move the cylindrical drum 4 to thereby shift the selected fork pin. In other words, the small width portions N and the large width portions W in the drum grooves 41 to 44 to which the fork pins are fitted, are so arranged that the fork pins positioned at the small width portions N are shifted depending upon the rotation of the cylindrical drum 4 so that the shifting is executed.

According to the speed change device of the present invention as described above, the rotation and the reciprocal motion of the cylindrical drum 4 execute the select operation and the shift operation independently. That is, unlike that of the conventional cam drum that has the tilted portions, the cylindrical drum 4 does not select the fork while at the same time shifting the fork by the rotation thereof. Namely, both sides of each drum groove in the cylindrical drum 4 in the axial direction are basically forming wall surfaces perpendicular to the axial direction. It is, therefore, allowed to greatly decrease the outer diameter of the cylindrical drum 4 as compared to that of the conventional cam drum, to decrease the rotational torque required for rotating the drum and, hence, to decrease the sizes of the drive devices such as the select motor 6 and the shift motor 7. Since no sliding occurs between the drum groove and the fork pin, the contact surfaces are not worn out.

In the above embodiment, the cylindrical drum 4 is fitted onto the rotary drum sleeve 3 so as to slide thereon but so as not to rotate, and the threaded shaft 1 is installed penetrating the drum sleeve 3 to constitute a feed screw mechanism for the cylindrical drum 4. In this speed change device, the drum sleeve 3 and the cylindrical drum 4 are arranged in concentric with the threaded shaft 1 that rotates; i.e., the speed change device becomes compact in size (the cylindrical drum 4 slightly moves in the axial direction when rotated since it is screw-coupled to the threaded shaft 1, but the amount of motion is so small as will not affect the shifting operation). Further, the plurality of fork pins fitted into the drum grooves are arranged along a straight line in the axial direction of the cylindrical drum 4. Besides, onto the shift rod SR that has a fork F4 coupled to an end thereof, there are fitted other forks and fork pins so as to slide. This makes it possible to easily constitute the support device for supporting the forks so as to move in the axial direction. From this point of view, too, the speed change device as a whole can be realized in a compact size.

Figure 6:
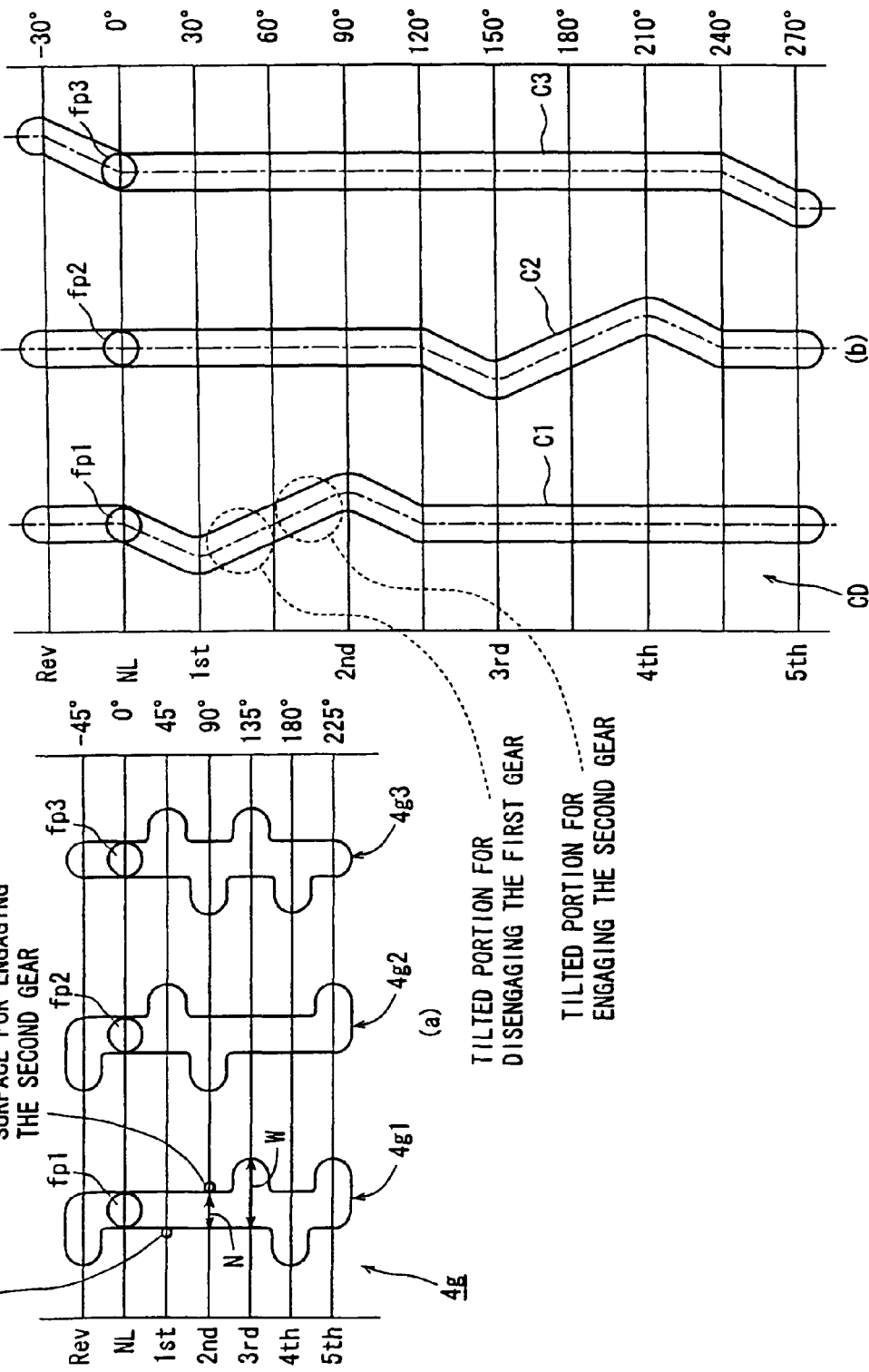
FIG. 6 is an expansion plan of the drum grooves of when the speed change device is adapted to a general transmission in comparison with the conventional cam grooves in a cam drum.

Next, described below is another embodiment of applying the speed change device of the invention to a general transmission. FIG. 6(a) is an expansion plan of the drum grooves of the cylindrical drum when the invention is applied to a transmission equipped with five forward gears and a reverse gear. For comparison, FIG. 6(b) shows the shapes of cam grooves in a conventional cam drum that executes the gear shift.

In the transmission equipped with five forward gears and one reverse gear, there are arranged three changing devices having dog clutches on both sides thereof, three forks for moving the speed-changing sleeves, and three fork pins coupled to the forks. FIG. 6(a) is the expansion plan similar to FIG. 4 and shows relationships between the drum grooves $4g1$ to $4g3$ formed in the cylindrical surface of the cylindrical drum $4g$ and the fork pins fp1 to fp3 fitted to the drum grooves of when the invention is applied to the speed change device of the above transmission.

In FIG. 6(a), the fork pin fp1 is coupled to the fork of the first speed-second speed changing device, the fork pin fp2 is coupled to the fork of the third speed-fourth speed changing device, and the fork pin fp3 is coupled to the fork of the fifth speed-reverse gear changing device. The drum grooves $4g1$ to $4g3$ into which the fork pins are fitted have small width portions N with the groove width in the axial direction of the cylindrical drum $9g$ nearly equal to that of the fork pins and large width portions W with the width greater than that of the fork pins, the small width portions N and the large width portions W being continuously formed in the circumferential direction as shown. The wall surfaces on both sides of the drum groove in the axial direction are perpendicular, at the small width portion. N, to the axial direction of the cylindrical drum $4g$. In the neutral state where the gears of the transmission are all released from mesh, the fork pins are positioned on a straight line NL that is shown.

To rotate and reciprocally move the cylindrical drum $4g$ in the axial direction, the speed change device is equipped with the drive mechanism, select motor and shift motor, which are the same as those shown in FIG. 2. To bring the transmission into mesh with the first gear, the cylindrical drum $4g$ is rotated by 45° to position the fork pins on a straight line 1st. Here, if the cylindrical drum $4g$ is moved toward the left in the axial direction in the drawing, only the fork pin fp1 positioned at the small width portion N moves toward the right bringing the speed-changing sleeve of the first speed-second speed changing device into mesh with the first gear. In this case, other fork pins are positioned in the large width portions having spaces on the right side, and are not moved. Other changing devices are not brought into engagement. Therefore, the vehicle is ready to travel with the first speed.

To shift the transmission from the first speed to the second speed, first, the cylindrical drum $4g$ is moved toward the right in a state where the fork pins are on the straight line 1st. As a result, the fork pin fp1 positioned at the small width portion N moves toward the right to release the engagement of the first speed, and the transmission is placed in the neutral state. Next, the cylindrical drum $4g$ is rotated up to 90° to align the fork pins on a straight line 2nd. Here, if the cylindrical drum $4g$ is moved toward the left, the fork pin fp1 positioned at the small width portion N moves toward the left bringing the speed-changing sleeve of the first speed-second speed changing device into mesh with the second gear. The transmission is thus shifted to the second speed. In this case, other fork pins are positioned in the large width portions W, and are not moved. Therefore, other changing devices are maintained at the positions where they are released from the engagement. Shift to the second speed and higher speeds or to the reverse gear is also executed in the same manner.

When the shifting operation is executed by using the conventional cam drum as described above, it is necessary as shown in FIG. 6(b) to form, in the cylindrical surface of the cam drum CD, three cam grooves C1 to C3 having tilted portions at different positions in the circumferential direction. That is, the tilted portions for moving the fork pins in the axial direction accompanying the rotation of the cam drum CD are possessed by the cam groove C1 for fork pin fp1 of the first speed-second speed changing device, by the cam groove C2 for fork pin fp2 of the third speed-fourth speed changing device and by the cam groove C3 for fork pin fp3 of the fifth speed-reverse gear changing device. In their neutral states, the fork pins are aligned along the straight line NL that is shown. To attain mesh with the first speed, for instance, the cam drum CD is rotated by 30° whereby the fork pin fp1 fitted into the cam groove C1 is shifted toward the left in the drawing along the tilted portion, and the gear of the first speed is engaged. To shift the first speed to the second speed, the cam drum CD is rotated up to 90° whereby the fork pin fp1 is shifted toward the right along the tilted portion in the opposite direction, the gear of the first speed is disengaged first and, thereafter, the gear of the second speed is engaged. At the time of shifting the second speed up to the third speed, the cam drum CD is rotated up to 120° to return the fork pin fp1 of the first speed-second speed changing device back to the neutral position. Thereafter, the cam drum CD is rotated up to 150° to shift the fork pin fp2 of the third speed-fourth speed changing device toward the left by the tilted portion of the cam groove C2.

As described above, the conventional cam drum is rotated to shift the fork operation members. Therefore, the tilted portions must be formed in the cylindrical surface at different positions in the circumferential direction. An increase in the number of the speeds of the transmission is accompanied by an increase in the number of the fork operation members resulting in an increase in the outer diameter of the cam drum. As will be obvious from the comparison of (a) with (b) of FIG. 6, on the other hand, the speed change device of the present invention makes it possible to greatly decrease the size of the cylindrical drum. With the cylindrical drum of the invention, further, the fork operation member at the time of engaging or disengaging the gear is shifted being pushed by the perpendicular wall surface of the groove. Therefore, there occurs no sliding between the contact surfaces such as of the fork operation member and the tilted portion of the cam groove.

INDUSTRIAL APPLICABILITY

As described above in detail, the speed change device of the invention is provided with the cylindrical drum having a plurality of drum grooves into which the fork operation members are fitted to shift the gear, each of the drum grooves forming small width portions having the width in the axial direction nearly equal to that of the fork operation member and large width portions having the width greater than that of the fork operation member in a manner that the fork operation member positioned at the small width portion is shifted depending upon the rotation of the cylindrical drum, whereby the cylindrical drum is moved in the axial direction to move the fork operation member positioned at the small width portion in the direction of shift. It will, therefore, be obvious that the invention can be used as the speed change device for a transmission of vehicles.

In the above embodiments, the fork operation members were arranged on a straight line. Depending upon the cases, however, the fork operation members may be arranged at dissimilar angular positions of the cylindrical drum, and the small width portions and the large width portions may be formed in the cylindrical surface of the cylindrical drum to meet thereto. It will be further obvious that the above embodiments can be modified in a variety of ways such as using a known rack-and-pinion type feed mechanism instead of driving the cylindrical drum in the direction of shift based on the feed-screw mechanism.

The invention claimed is:

1. A speed change device for shifting a gear of a transmission, comprising:
    a plurality of speed-changing sleeves in said transmission, said plurality of speed-changing sleeves moving in an axial direction to shift the gear;
    a plurality of forks for moving said speed-changing sleeves, said plurality of forks comprising a plurality of fork operation members coupled thereto;
    a cylindrical drum that is installed so as to be reciprocally movable in the axial direction and being rotatably supported, the cylindrical surface of said cylindrical drum forming a plurality of drum grooves into which said fork operation members are fitted,
        wherein said drum grooves are each forming, continuously in a circumferential direction, small width portions with their both sides being perpendicular to an axial direction of said cylindrical drum and having a width in the axial direction of said cylindrical drum nearly equal to that of a fork operation member of said fork operation members, and large width portions having a groove width in the axial direction of said cylindrical drum larger than that of said fork operation member, said small width portions and said large width portions in the plurality of the drum grooves being provided such that said fork operation member positioned at said small width portion is changed depending upon a rotation of said cylindrical drum, whereby said fork operation member positioned at said small width portion of said drum groove is selected by the rotation of said cylindrical drum, and the selected fork operation member is moved in the axial direction of said cylindrical drum by the reciprocal motion of said cylindrical drum;
    a rotary drum sleeve that is arranged inside of said cylindrical drum;
    a threaded shaft that is arranged penetrating through said rotary drum sleeve in concentric with said rotary drum sleeve;
    a nut body that is located in said cylindrical drum at a portion apart from said rotary drum sleeve in an axial direction of said threaded shaft,
        wherein said cylindrical drum is fitted together onto said rotary drum sleeve so as to slide but so as not to rotate, and is screw-coupled via said nut body to said threaded shaft; and
    a select actuator and a shift actuator mounted on a casing of said transmission, each actuator operating independently,
        wherein said select actuator rotates said rotary drum sleeve around said threaded shaft accompanying the rotation of said cylindrical drum, and
        wherein said shift actuator rotates said threaded shaft accompanying the reciprocally movement of said cylindrical drum in the axial direction of said cylindrical drum.

2. The speed change device according to claim 1, wherein said plurality of fork operation members are linearly arranged in the axial direction of said cylindrical drum.

3. The speed change device according to claim 2, wherein one of the plurality of fork operation members comprises a shift rod that extends in the axial direction of said cylindrical drum and is supported so as to slide, and
    wherein one of the plurality of forks is fixed to an end portion of said shift rod, and other forks are fitted onto said shift rod so as to slide and move on said shift rod by the reciprocal motion of said cylindrical drum.

4. The speed change device according to claim 1, wherein said transmission is a dual clutch type transmission comprising two clutches and two input shafts connected to respective clutches.

5. The speed change device according to claim 1, wherein each of said select actuator and said shift actuator is an electric motor and operates said cylindrical drum via a gear train.

6. The speed change device according to claim 1, wherein said large width portions of said drum grooves include walls that extend to the axial direction of said cylindrical drum.

7. The speed change device according to claim 1, wherein the cylindrical drum rotates upon rotating said rotary drum sleeve.

8. The speed change device according to claim 1, wherein upon rotating of said threaded shaft, the cylindrical drum reciprocally moves in the axial direction of the cylindrical drum to execute a shift operation.

9. The speed change device according to claim 1, wherein said rotary drum sleeve and the cylindrical drum are arranged in concentric with said threaded shaft.

10. The speed change device according to claim 1, wherein the cylindrical drum reciprocally moves relying on a rotation of said threaded shaft.

* * * * *